Patented Nov. 9, 1937

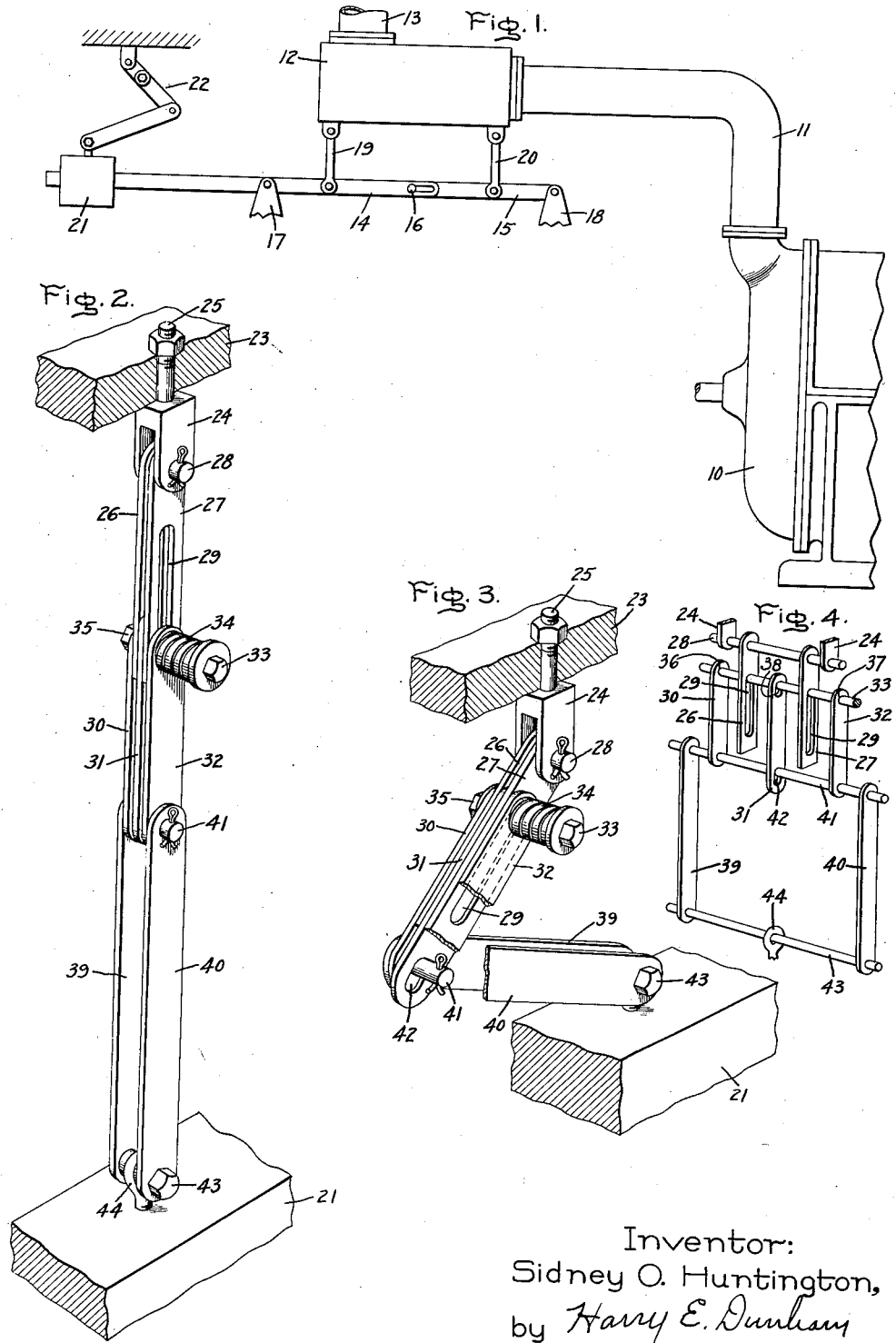

2,098,805

UNITED STATES PATENT OFFICE 2,098,805

SAFETY DEVICE

Sidney O. Huntington, Schenectady, N. Y., assignor to General Electric Company, a corporation of New York Application February 28, 1934, Serial No. 713,294

2 Claims. (Cl. 248—1)

The present invention relates to safety devices which may be used for supporting heavy bodies in case the normal support of such bodies fails. For example, it is desirable to connect the heavy weight on a weigh-beam to a safety chain or link whereby the drop of the weight is limited or the impact of the weight on the floor is reduced in case the weigh-beam breaks.

One object of my invention is to provide an improved construction and arrangement of safety devices whereby a heavy body is effectively supported by a comparatively light supporting structure in case the normal supporting means of the body fails.

For a consideration of what I believe to be novel and my invention, attention is directed to the following description and the claims appended thereto.

In the drawing, Fig. 1 shows an arrangement including the safety device embodying my invention; Figs. 2 and 3 are perspective views of the safety device; and Fig. 4 is an exploded view of the safety device.

The arrangement of Fig. 1 comprises an elastic fluid turbine 10 having an inlet conduit 11 of considerable length connected to a valve chest 12. The latter has an inlet 13 for receiving elastic fluid to be conducted to the turbine. The valve chest has a considerable weight of the order of several tons. During operation considerable forces are transmitted to the valve chest which causes movement thereof due to expansion of the turbine 10 and the conduit 11 in horizontal and vertical direction. To permit such expansion and at the same time maintain the valve chest in a horizontal position, a special support for the latter is provided. This support comprises two levers 14 and 15 having adjacent ends pivotally connected at 16 and being fulcrumed at 17 and 18 respectively. An intermediate point of each lever is connected to the valve chest by links 19 and 20 respectively. The supporting structure permits movement of the valve chest 12 but constrains such movement to certain conditions, more specifically to parallelism. The center line of the valve chest then remains under all conditions horizontal. The weight of the chest is counter-balanced by a weight 21 provided on the left-hand extension of the lever 14. The lever 14 then forms a weigh-beam. The structure so far described forms a part of and is more fully disclosed in the application of D. A. Allee, Serial No. 708,563 filed January 27, 1934. The weight 21 is normally supported by the weigh-beam 14 and the fulcrums 17 and 18. In case this normal support fails, for instance, due to breakage of the weigh-beam 14, safety means 22 are provided which limit the drop of the weight 21, or, from another viewpoint, which reduce the impact of the weight 21 on the floor or the like by reducing its inertia.

The safety device as illustrated in Figs. 2, 3 and 4 comprises a plurality of links. At least one of the links is connected to a fixed support 23 and at least another link is connected to the body 21 whose fall has to be limited. The links are held together with a predetermined force by means including a bolt and preferably a spring for forcing the links together. At least one of the links has a slot through which the bolt projects, which slot permits expansion of the link whereby frictional resistance is set up between the link members, and the kinetic energy of the mass of the falling body is considerably reduced. More specifically, the device comprises a fork 24 fastened to the fixed support 23 by means of a bolt 25. Two links 26 and 27 are connected to the fork 24 by means of a pivot 28. Each of the links 26 and 27 has a longitudinal slot 29. Connected to the lower ends of the links 26 and 27 are three other links 30, 31 and 32, the link 30 of which engages the outer surface of link 26, the link 32 engages the outer surface of link 27 and the link 31 is provided intermediate the links 26 and 27. The five links 26, 27, 30, 31 and 32 are connected by a bolt 33 and their engaging surfaces are forced together with a predetermined force by means of a spring 34 and a nut 35 on the bolt 33. In the present example the links 30 and 32 are provided with upper holes 36 and 37, respectively, just large enough to accommodate the bolt 33. The central link 31 has a slot 38 for accommodating the bolt and permitting relative movement between the link 31 and the links 30 and 32, the lower ends of the links 30, 31 and 32 are connected to two links 39 and 40 by means of a pivot 41. The links 39 and 40 engage the outer, lower surfaces of links 30 and 32 respectively, and the holes in said links are just large enough to accommodate the pivot 41, whereas the central link 31 has a short slot 42 of the same length as the upper slot 38, permitting relative movement between the pivot 41 and the central link 31. The lower ends of the links 39 and 40 are connected by a bolt 43 which has a central portion projecting through a ring bolt 44 which latter is screwed into the body 21 whose movement has to be limited in case of failure of its normal supporting means. Fig. 2 shows the safety link expanded in its position upon failure of the normal support of the body 21, and Figs. 1 and 3 show the safety link during normal operation of the structure to be protected.

The operation of the device is as follows: As pointed out above, the links 26, 27, 30, 31 and 32 are forced together with a predetermined force by the bolt and the spring thereon. This causes a frictional resistance being set up by the links. It is important to note that the frictional resistance at rest is about twice to five times the resistance apparent during relative movement between the links. In accordance with my invention, the arrangement of the links is such that the frictional resistance of rest between them is not broken at once but in several steps, in the present instance in two steps. More specifically, during operation at first the frictional resistance between the upper links 26 and 27 and the outer links 30 and 32 is broken, whereby the central link 31 remains at rest. The bolt 33 then moves downward in the slot 38 until it assumes a position with respect to the central link in which it engages the lower end of the slotted link portion. During this movement the pivot 41 moves downward into the lower end of slot 42 into engagement with the lower portion of the link 31. As soon as this position is reached, the second step of breaking the frictional resistance between the five links begins in that the pivot 41 pulls the central link downward and thereby breaks the frictional resistance between the central link 31 and the inner surfaces of the upper links 26 and 27. The stepped breaking of the frictional resistance causes at the same time a stepped increase of the frictional resistance set up between the moving links, whereby the arrangement may be such that the frictional resistance remains substantially constant or increases or decreases with the drop of the weight as desired. Attention must be paid that no change of the frictional resistance at rest takes place. Such changes could be effected, for example, by a change in temperature causing different expansion of the bolt and the links. It is therefore desirable to make both the bolt and the links of the same or suitable material. The frictional resistance, furthermore, might change due to corrosion of the material. It is therefore preferable to use a material which does not corrode and erode, such as Monel metal.

In a preferred embodiment of my invention I paint the engaging surfaces of the links with a mixture of graphite and oil. Such coating is not affected by temperature and weather conditions and in addition provides for a uniform frictional resistance between the links and prevents the contacting link portions from growing together. The spring has preferably a plurality of turns to minimize the effects of possible relative expansion of the bolt and the links.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States, is:

1. A safety device for limiting the movement of a body comprising a link having one end to be connected to a fixed support, a plurality of other links, means including a bolt and a spring for fastening the other links to the first named link and causing adjacent surfaces of the links to contact each other with a predetermined force, said bolt projecting through bores and slots of varying lengths in the links, and means for connecting the plurality of links to the body whose movement has to be limited, the bolt connection through the slots of varying length permitting a stepped breaking of the friction of rest between the contacting link portions.

2. A safety device for limiting the movement of a body comprising a first link having a long slot and one end to be connected to a fixed support, a second link with two bores, and a third link with two short slots, means including a bolt projecting through one of the bores, the long slot and one of the short slots for causing the adjacent surfaces of the three links to contact each other with a predetermined force, and means including another bolt projecting through the other short slot and the other bore for connecting the device to the body whose movement has to be limited, the bolt connection through the slots of different lengths permitting a stepped breaking of the friction of rest between the contacting link portions.

SIDNEY O. HUNTINGTON.